US012668696B2

(12) United States Patent
Umeki et al.

(10) Patent No.: US 12,668,696 B2
(45) Date of Patent: Jun. 30, 2026

(54) THERMOPLASTIC RESIN AND OPTICAL MEMBER INCLUDING SAME

(71) Applicant: TEIJIN LIMITED, Osaka (JP)

(72) Inventors: Atsushi Umeki, Osaka (JP); Ryouta Mano, Osaka (JP); Takatsune Yanagida, Osaka (JP); Yasuhiko Tomonari, Osaka (JP); Keisuke Sato, Osaka (JP)

(73) Assignee: TEIJIN LIMITED, Osaka (JP)

( * ) Notice: Subject to any disclaimer, the term of this patent is extended or adjusted under 35 U.S.C. 154(b) by 568 days.

(21) Appl. No.: 18/032,744

(22) PCT Filed: Oct. 13, 2021

(86) PCT No.: PCT/JP2021/037853

§ 371 (c)(1),
(2) Date: Apr. 19, 2023

(87) PCT Pub. No.: WO2022/091780

PCT Pub. Date: May 5, 2022

(65) Prior Publication Data

US 2024/0010834 A1 Jan. 11, 2024

(30) Foreign Application Priority Data

Oct. 27, 2020 (JP) ................................ 2020-179567

(51) Int. Cl.
*C08L 69/00* (2006.01)

(52) U.S. Cl.
CPC ......... *C08L 69/005* (2013.01); *C08L 2205/02* (2013.01)

(58) Field of Classification Search
CPC ..... C08G 63/64; C08L 2205/02; C08L 69/00; C08L 69/005
See application file for complete search history.

(56) References Cited

U.S. PATENT DOCUMENTS

2017/0051146 A1 2/2017 Ishizuka et al.
2021/0002420 A1 1/2021 Yamada et al.
2021/0147621 A1 5/2021 Yamada et al.
2022/0106483 A1 4/2022 Motegi et al.
2022/0145004 A1 5/2022 Ikeda et al.

FOREIGN PATENT DOCUMENTS

CN 106459572 2/2017
CN 109415500 3/2019
CN 110741030 1/2020
CN 111655754 9/2020
JP 2018-2894 1/2018
JP 2018-177887 11/2018
TW 202033606 9/2020

(Continued)

OTHER PUBLICATIONS

International Search Report issued Dec. 7, 2021 in International (PCT) Application No. PCT/JP2021/037853.

(Continued)

*Primary Examiner* — Ana L. Woodward
(74) *Attorney, Agent, or Firm* — Wenderoth, Lind & Ponack, L.L.P.

(57) ABSTRACT

A thermoplastic resin composition comprising a thermoplastic resin (A) containing a unit represented by formula (1) and a thermoplastic resin (B) containing a unit represented by formula (2), wherein in the formula (1), $L^1$ and $L^2$ each independently represent a divalent linking group, k and l each independently represent an integer of 0 or more, $R^1$, $R^2$, $R^3$, and $R^4$ each independently represent a hydrogen atom or a hydrocarbon group having 1 to 20 carbon atoms, and W represents a divalent linking group; and in the formula (2), $L^3$ and $L^4$ each independently represent a divalent linking group, m and n each independently represent an integer of 0 or more, and $R^5$, $R^6$, $R^7$, and $R^8$ each independently represent a hydrogen atom or a hydrocarbon group having 1 to 20 carbon atoms.

(1)

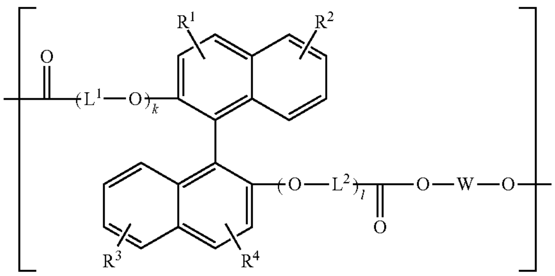

(2)

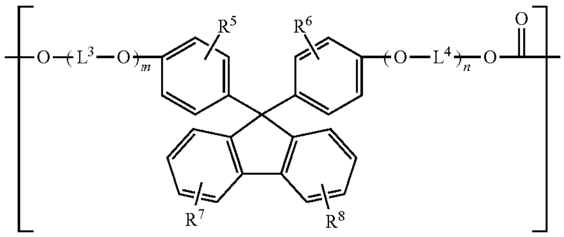

8 Claims, No Drawings

(56) References Cited

FOREIGN PATENT DOCUMENTS

| | | |
|---|---|---|
| WO | 2015/166951 | 11/2015 |
| WO | 2015/170691 | 11/2015 |
| WO | 2018/008483 | 1/2018 |
| WO | 2018/181157 | 10/2018 |
| WO | 2019/176874 | 9/2019 |
| WO | 2020/175663 | 9/2020 |

OTHER PUBLICATIONS

International Preliminary Report on Patentability issued May 2, 2023 in corresponding International (PCT) Patent Application No. PCT/JP2021/037853.

Office Action issued Nov. 21, 2024 in Chinese Patent Application No. 202180072966.4, with English-language Translation.

THERMOPLASTIC RESIN AND OPTICAL MEMBER INCLUDING SAME

TECHNICAL FIELD

The present invention relates to a novel thermoplastic resin and an optical member, particularly an optical lens, formed from the thermoplastic resin.

BACKGROUND ART

Imaging modules are used in devices such as a smartphone. An optical system used in this imaging module is required to be miniaturized. As the size of the optical system is reduced, chromatic aberration of the optical system becomes a serious problem. Therefore, by combining an optical lens with a high refractive index and a low Abbe number to achieve high dispersion and an optical lens with a low refractive index and a high Abbe number to achieve low dispersion, the chromatic aberration is corrected.

PTL 1 describes that even if a polycarbonate resin composition containing a polycarbonate resin having a structural unit represented by formula (M) and a polycarbonate resin having a structural unit represented by formula (N) is kneaded at each ratio, a polycarbonate resin having a low refractive index and a high Abbe number can be obtained without deteriorating hue and haze.

[Chemical 1]

(M)

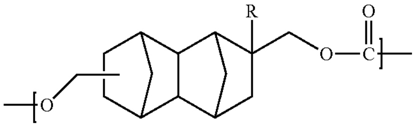

[Chemical 2]

(N)

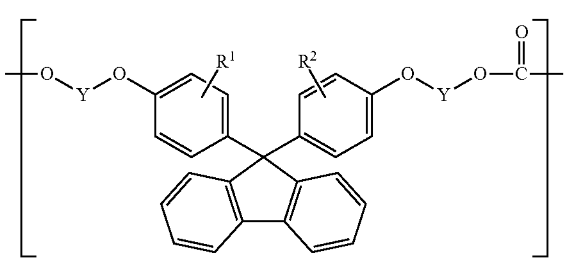

PTL 2 describes a polycarbonate resin composition obtained by kneading a polycarbonate resin having a structural unit represented by formula (P) and a polycarbonate resin having a structural unit represented by formula (Q), and describes that the resin composition has a high refractive index, fluidity suitable for molding, low birefringence, and little optical distortion.

[Chemical 3]

(P)

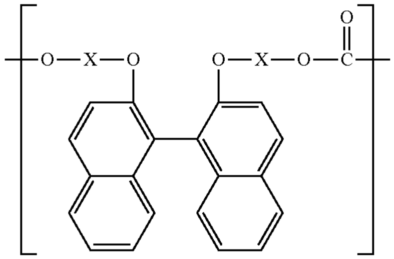

[Chemical 4]

(Q)

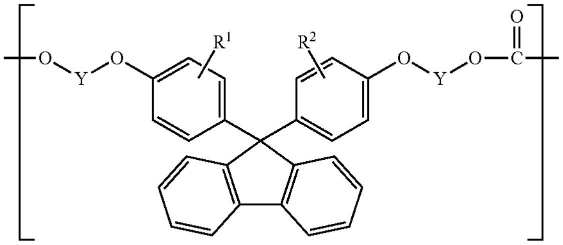

Among them, high refractive index resins are attracting attention accompanied with rapid technological innovation in recent years, and further increase in refractive index is required.

CITATION LIST

Patent Literature

PTL 1: WO 2018/181157 A

PTL 2: WO 2015/166951 A

SUMMARY OF INVENTION

Technical Problem

Therefore, an object of the present invention is to efficiently produce and provide a material with a wide high refractive index range that has a high refractive index, low haze, low birefringence, excellent balance between heat resistance and moldability, a high Charpy impact strength, and low water absorption.

Solution to Problem

The present inventors have found that the above problems can be solved by the present invention having the following aspects.

<<Aspect 1>>

A thermoplastic resin composition containing a thermoplastic resin (A) containing a unit represented by formula (1) and a thermoplastic resin (B) containing a unit represented by formula (2).

[Chemical 5]

(1)

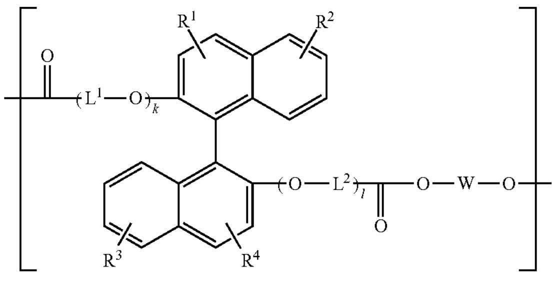

{In the formula (1), $L^1$ and $L^2$ each independently represent a divalent linking group, k and 1 each independently represent an integer of 0 or more, $R^1$, $R^2$, $R^3$, and $R^4$ each independently represent a hydrogen atom or a hydrocarbon group having 1 to 20 carbon atoms, and W represents a divalent linking group.}

[Chemical 6]

(2)

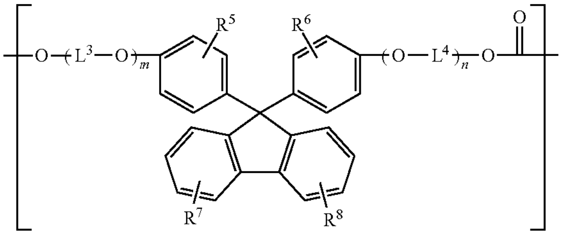

(In the formula (2), $L^3$ and $L^4$ each independently represent a divalent linking group, m and n each independently represent an integer of 0 or more, and $R^5$, $R^6$, $R^7$, and $R^8$ each independently represent a hydrogen atom or a hydrocarbon group having 1 to 20 carbon atoms)

<<Aspect 2>>

The thermoplastic resin composition according to aspect 1, in which W in the formula (1) includes formula (3) or (4).

[Chemical 7]

(3)

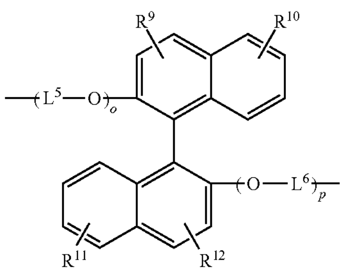

(In the formula (3), $L^5$ and $L^6$ each independently represent a divalent linking group, o and p each independently represent an integer of 0 or more, and $R^9$, $R^{10}$, and $R^{12}$ each independently represent a hydrogen atom or a hydrocarbon group having 1 to 20 carbon atoms)

[Chemical 8]

(4)

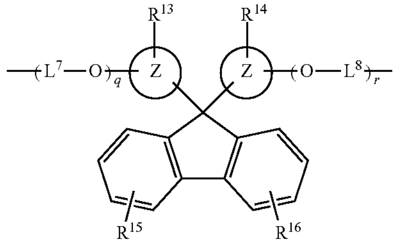

(In the formula (4), ring Z is the same or different and represents an aromatic hydrocarbon ring, $L^7$ and $L^8$ each independently represent a divalent linking group, q and r each independently represent an integer of 0 or more, and $R^{13}$, $R^{14}$, $R^{15}$, and $R^{16}$ each independently represent a hydrogen atom or a hydrocarbon group having 1 to 20 carbon atoms)

<<Aspect 3>>

The thermoplastic resin composition according to aspect 2, in which Z in the formula (4) is a naphthalene ring.

<<Aspect 4>>

The thermoplastic resin composition according to any one of aspects 1 to 3, having a haze of 0.5% or less when measured at a thickness of 3 mm.

<<Aspect 5>>

The thermoplastic resin composition according to any one of aspects 1 to 4, in which a mass ratio (A:B) of the thermoplastic resin (A) and the thermoplastic resin (B) is 1:99 to 99:1.

<<Aspect 6>>

The thermoplastic resin composition according to any one of aspects 1 to 5, having a refractive index of 1.645 to 1.690.

<<Aspect 7>>

The thermoplastic resin composition according to any one of aspects 1 to 6, having an orientation birefringence of $4.5\times10^{-3}$ or less.

<<Aspect 8>>

The thermoplastic resin composition according to any one of aspects 1 to 7, having an unnotched Charpy impact strength of 25 $J/m^2$ or more.

<<Aspect 9>>

The thermoplastic resin composition according to any one of aspects 1 to 8, in which the thermoplastic resin (A) is a polyester carbonate resin.

<<Aspect 10>>

The thermoplastic resin composition according to any one of aspects 1 to 9, in which the thermoplastic resin (B) is a polyester carbonate resin or a polycarbonate resin.

<<Aspect 11>>

An optical member containing the thermoplastic resin composition according to any one of aspects 1 to 10.

Advantageous Effects of Invention

The thermoplastic resin composition of the present invention can efficiently produce a material with a wide high refractive index range that has a high refractive index, low birefringence, excellent balance between heat resistance and moldability, low haze, high Charpy impact strength, and low water absorption.

DESCRIPTION OF EMBODIMENTS

Embodiments for carrying out the present invention will be described in detail below, but the present invention is not limited thereto, and various modifications can be made without departing from the gist of the present invention.

<<Thermoplastic Resin (A)>>

The thermoplastic resin (A) in the present invention contains a structural unit represented by the above formula (1).

In the above formula (1), $R^1$, $R^2$, $R^3$, and $R^4$ each independently represent a hydrogen atom or a hydrocarbon group having 1 to 20 carbon atoms, and examples of the hydrocarbon group include an alkyl group, a cycloalkyl group, and an aryl group.

Examples of the alkyl group include methyl group, ethyl group, propyl group, isopropyl group, butyl group, and t-butyl group, and the methyl group is preferred.

Examples of the cycloalkyl group include cyclopropyl group, cyclobutyl group, cyclopentyl group, cyclohexyl group, and bicyclo[1.1.1]pentanyl group.

Examples of the aryl group include phenyl group, tolyl group, naphthyl group, and xylyl group, and the phenyl group is preferred.

$R^1$ to $R^4$ are each independently preferably a hydrogen atom, a methyl group, or a phenyl group, more preferably a hydrogen atom or a phenyl group, and still more preferably a hydrogen atom.

In the above formula (1), $L^1$ and $L^2$ each independently represent a divalent linking group, for example, an alkylene group having 1 to 4 carbon atoms, preferably a methylene group, an ethylene group, or a propylene group, and more preferably a methylene group.

In the above formula (1), k and l each independently represent an integer of 0 or more, preferably 0 to 2, and more preferably 1.

In the above formula (1), W represents a divalent linking group, preferably the above formula (3) or the above formula (4).

In the above formula (1), the 1,1'-binaphthyl skeleton improves the refractive index and has a conformation in which two naphthalene rings are perpendicular to each other through a bond axis connecting the two naphthalene rings, and thus has an effect of reducing birefringence.

In the above formula (3), $R^9$, $R^{10}$, $R^{11}$, and $R^{12}$ each independently represent a hydrogen atom or a hydrocarbon group having 1 to 20 carbon atoms, and examples of the hydrocarbon group include an alkyl group, a cycloalkyl group, and aryl group.

Examples of the alkyl group include methyl group, ethyl group, propyl group, isopropyl group, butyl group, and t-butyl group, and the methyl group is preferred.

Examples of the cycloalkyl group include cyclopropyl group, cyclobutyl group, cyclopentyl group, cyclohexyl group, and bicyclo[1.1.1]pentanyl group.

Examples of the aryl group include phenyl group, tolyl group, naphthyl group, and xylyl group, and the phenyl group is preferred.

$R^9$ to $R^{12}$ are each independently preferably a hydrogen atom, a methyl group, or a phenyl group, more preferably a hydrogen atom or a phenyl group, and still more preferably a hydrogen atom.

In the above formula (3), $L^5$ and $L^6$ each independently represent a divalent linking group, for example, an alkylene group having 1 to 4 carbon atoms, and represent preferably an ethylene group or a propylene group, and more preferably an ethylene group.

o and p each independently represent an integer of 0 or more, preferably 0 to 2, and more preferably 1.

In the above formula (3), the 1,1'-binaphthyl skeleton improves the refractive index and has a conformation in which two naphthalene rings are perpendicular to each other through a bond axis connecting the two naphthalene rings, and thus has the effect of reducing birefringence.

In the above formula (4), Z is the same or different and represents an aromatic hydrocarbon ring, for example, a naphthalene ring and a benzene ring, and the naphthalene ring is preferred.

$R^{13}$, $R^{14}$, $R^{15}$, and $R^{16}$ each independently represent a hydrogen atom or a hydrocarbon group having 1 to 20 carbon atoms, and examples of the hydrocarbon group include an alkyl group, a cycloalkyl group and an aryl group.

Examples of the alkyl group include methyl group, ethyl group, propyl group, isopropyl group, butyl group, and t-butyl group, and the methyl group is preferred.

Examples of the cycloalkyl group include cyclopropyl group, cyclobutyl group, cyclopentyl group, cyclohexyl group, and bicyclo[1.1.1]pentanyl group.

Examples of the aryl group include phenyl group, tolyl group, naphthyl group, and xylyl group, and the phenyl group is preferred.

$R^{13}$ to $R^{16}$ are each independently preferably a hydrogen atom, a methyl group, or a phenyl group, more preferably a hydrogen atom or a phenyl group, and still more preferably a hydrogen atom.

$L^7$ and $L^8$ each independently represent a divalent linking group, for example, an alkylene group having 1 to 4 carbon atoms, and represent preferably an ethylene group or a propylene group, and more preferably an ethylene group.

q and r each independently represent an integer of 0 or more, preferably 0 to 2, and more preferably 1.

Since the above formula (4) has a cardo structure, it exhibits high heat resistance and has the effect of reducing birefringence.

The thermoplastic resin (A) may contain the unit represented by the above formula (1) singly or in combination of two or more. For example, in the above formula (1), both a unit in which W is the above formula (3) and a unit in which W is the above formula (4) may be included.

As the thermoplastic resin (A), a polyester resin or a polyester carbonate resin is preferred, and a polyester carbonate resin is more preferred.

<<Dicarboxylic Acid Component Used in the Unit Represented by the Above Formula (1)>>

A dicarboxylic acid component used in the unit represented by the above formula (1) of the thermoplastic resin of the present invention is mainly a compound represented by formula (a) or an ester-forming derivative thereof.

[Chemical 9]

(a)

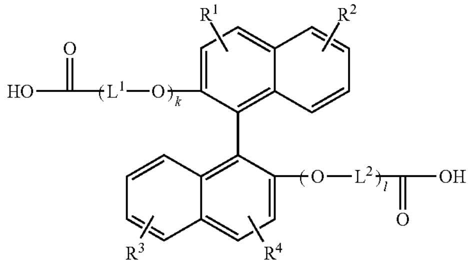

In the above formula (a) of the dicarboxylic acid component that is a raw material of the above formula (1), $L^1$, $L^2$, k, l, and $R^1$ to $R^4$ are the same as those in the above formula (1).

Specific examples of the dicarboxylic acid component include 2,2'-bis(carboxymethoxy)-3,3'-dimethyl-1,1'-binaphthyl, 2,2'-bis(carboxymethoxy)-6,6'-dimethyl-1,1'-binaphthyl, 2,2'-bis(carboxymethoxy)-7,7'-dimethyl-1,1'-binaphthyl, 2,2'-bis(carboxymethoxy)-3,3'-diphenyl-1,1'-binaphthyl, 2,2'-bis(carboxymethoxy)-6,6'-diphenyl-1,1'-binaphthyl, 2,2'-bis(carboxymethoxy)-7,7'-diphenyl-1,1'-binaphthyl, 2,2'-bis(carboxymethoxy)-1,1'-binaphthyl, 2,2'-bis(2-carboxyethoxy)-1,1'-binaphthyl, 2,2'-bis(3-carboxypropoxy)-1,1'-binaphthyl, 2,2'-bis(3-carboxy-2-methylpropoxy)-1,1'-binaphthyl, and 2,2'-bis(4-carboxyphenylmethoxy)-1,1'-binaphthyl, and among them, 2,2'-bis(carboxymethoxy)-1,1'-binaphthyl, 2,2'-bis(2-carboxyethoxy)-1,1'-binaphthyl, 2,2'-bis(3-carboxypropoxy)-1,1'-binaphthyl, 2,2'-bis(3-carboxy-2-methylpropoxy)-1,1'-binaphthyl, and 2,2'-bis(4-carboxyphenylmethoxy)-1,1'-binaphthyl are preferred, and 2,2'-bis(carboxymethoxy)-1,1'-binaphthyl is more preferred.

These may be used alone or in combination of two or more. Further, as the ester-forming derivative, acid chlorides and esters such as methyl esters, ethyl esters and phenyl esters may be used.

<<Diol Component Used in the Unit Represented by the Above Formula (1)>>

Examples of a diol component used in a unit represented by W in the above formula (1) of the thermoplastic resin of the present invention include ethylene glycol, propanediol, butanediol, pentanediol, hexanediol, heptanediol, octanediol, nonane diol, tricyclo[5.2.1.0$^{2,6}$]decanedimethanol, cyclohexane-1,4-dimethanol, decalin-2,6-dimethanol, norbornanedimethanol, pentacyclopentadecanedimethanol, cyclopentane-1,3-dimethanol, spiroglycol, isosorbide, isomannide, isoidide, hydroquinone, resorcinol, dihydroxynaphthalene, 2,2-bis(4-hydroxyphenyl)propane, 2,2-bis(3-methyl-4-hydroxyphenyl)propane, 1,1-bis(4-hydroxyphenyl)-1-phenylethane, 1,3-bis(2-(4-hydroxyphenyl)-2-propyl)benzene, 1,1-bis(4-hydroxyphenyl)-3,3,5-trimethylcyclohexane, 1,1-bis(4-hydroxyphenyl)cyclohexane, bis(4-hydroxyphenyl) diphenylmethane, 1,1-bis(4-hydroxyphenyl)decane, bis(4-hydroxyphenyl)sulfide, bis(4-hydroxy-3-methylphenyl) sulfide, biphenol, 9,9-bis(4-hydroxyphenyl)fluorene, 9,9-bis (4-hydroxy-3-methylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy) phenyl)fluorene, 9,9-bis(4-(2-hydroxyethoxy)-3-methylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, bis(4-hydroxyphenyl)sulfone, bis(4-(2-hydroxyethoxy)phenyl)sulfone, 10,10-bis(4-hydroxyphenyl)anthrone, the following formula (b), and the following formula (c), and among them, 9,9-bis(4-(2-hydroxyethoxy)phenyl)fluorene, 9,9-bis(4-(2-hydroxyethoxy)-3-methylphenyl)fluorene, the formula (b), and the formula (c) are preferred, and the formula (b) and the formula (c) are more preferred.

[Chemical 10]

(b)

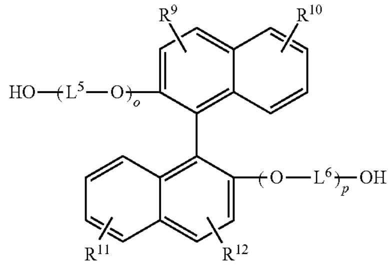

In the above formula (b) of the diol component, $L^5$, $L^6$, o, p, and $R^9$ to $R^{12}$ are the same as those in the above formula (3).

[Chemical 11]

(c)

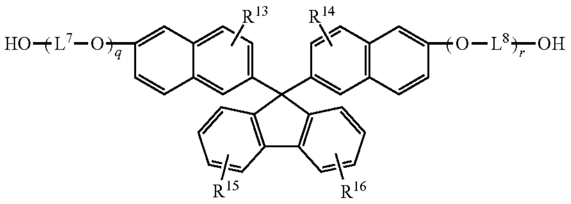

In the above formula (c) of the diol component, $L^7$, $L^8$, q, r, and $R^{13}$ to $R^{16}$ are the same as those in the above formula (4).

Specific examples of the above formula (b) include 2,2'-bis(2-hydroxyethoxy)-1,1'-binaphthyl, 2,2'-bis(2-hydroxyethoxy)-3,3'-diphenyl-1,1'-binaphthyl, 2,2'-bis(2-hydroxyethoxy)-6,6'-diphenyl-1,1'-binaphthyl, 2,2'-bis(2-hydroxyethoxy)-7,7'-diphenyl-1,1'-binaphthyl, 2,2'-bis(2-hydroxyethoxy)-3,3'-dimethyl-1,1'-binaphthyl, 2,2'-bis(2-hydroxyethoxy)-6,6'-dimethyl-1,1'-binaphthyl, 2,2'-bis(2-hydroxyethoxy)-7,7'-dimethyl-1,1'-binaphthyl, 1,1'-bi-2-naphthol, 2,2'-dihydroxy-3,3'-diphenyl-1,1'-binaphthyl, 2,2'-dihydroxy-6,6'-diphenyl-1,1'-binaphthyl, and 2,2'-dihydroxy-7,7'-diphenyl-1,1'-binaphthyl, and 2,2'-bis(2-hydroxyethoxy)-1,1'-binaphthyl and 2,2'-bis(2-hydroxyethoxy)-6,6'-diphenyl-1,1'-binaphthyl are preferred, and 2,2'-bis(2-hydroxyethoxy)-1,1'-binaphthyl is more preferred.

These may be used alone or in combination of two or more.

Specific examples of the above formula (c) include 9,9-bis(6-(2-hydroxyethoxy)-2-naphthyl)-2,7-dimethylfluorene, 9,9-bis(6-(2-hydroxy ethoxy)-2-naphthyl)-2,7-diphenylfluorene, 9,9-bis(6-(2-hydroxyethoxy)-2-naphthyl)fluorene, 9,9-bis(6-(3-hydroxypropoxy)-2-naphthyl)-2,7-diphenylfluorene, 9,9-bis(6-(3-hydroxypropoxy)-2-naphthyl)-2,7-dimethylfluorene, 9,9-bis(6-(3-hydroxypropoxy)-2-naphthyl)fluorene, 9,9-bis(6-hydroxy-2-naphthyl)-2,7-diphenylfluorene, 9,9-bis(6-hydroxy-2-naphthyl)-2,7-dimethylfluorene, and 9,9-bis(6-hydroxy-2-naphthyl) fluorene. Among them, 9,9-bis(6-(3-hydroxypropoxy)-2-naphthyl)fluorene, 9,9-bis(6-(2-hydroxyethoxy)-2-naphthyl)fluorene, and 9,9-bis(6-hydroxy-2-naphthyl) fluorene are preferred, and 9,9-bis(6-(2-hydroxyethoxy)-2-naphthyl)fluorene is more preferred.

These may be used alone or in combination of two or more.

<<Copolymer Components Other than the Above Formula (1)>>

The thermoplastic resin (A) of the present invention may contain repeating units other than a repeating unit represented by the above formula (1) as long as the above advantageous effects of the present invention can be obtained. Proportion of the structural unit represented by the above formula (1) of the thermoplastic resin (A) in the present invention is preferably 50 mol % or more, and more preferably 70 mol % or more. Examples of the repeating units other than the repeating unit represented by formula (1) include polycarbonates, polyesters, and polyester carbonates, and their dicarboxylic acid components and diol components are shown below.

Examples of the dicarboxylic acid components include aliphatic dicarboxylic acid components such as malonic acid, succinic acid, glutaric acid, adipic acid, pimelic acid, suberic acid, azelaic acid, methylmalonic acid, and ethylmalonic acid, monocyclic aromatic dicarboxylic acid components such as phthalic acid, isophthalic acid, and terephthalic acid, polycyclic aromatic dicarboxylic acid components such as 2,6-naphthalenedicarboxylic acid, 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid, phenanthenedicarboxylic acid, 9,9-bis(carboxymethyl)fluorene, 9,9-bis(2-carboxyethyl)fluorene, 9,9-bis(1-carboxvethyl)fluorene, 9,9-bis(1-carboxypropyl)fluorene, 9,9-bis(2-carboxypropyl)fluorene, 9,9-bis(2-carboxy-1-methylethyl) fluorene, 9,9-bis(2-carboxy-1-methylpropyl)fluorene, 9,9-bis(2-carboxybutyl)fluorene, 9,9-bis(2-carboxy-1-methylbutyl)fluorene, 9,9-bis(5-carboxypentyl)fluorene, and 9,9-bis(carboxycyclohexyl)fluorene, alicyclic dicarboxylic acid components such as 1,4-cyclohexanedicarboxylic acid and 2,6-decalinedicarboxylic acid, and these may be used alone or in combination of two or more. Further, as the ester-forming derivative, acid chlorides and esters such as methyl esters, ethyl esters, and phenyl esters may be used.

Examples of the diol components include ethylene glycol, propanediol, butanediol, pentanediol, hexanediol, heptanediol, octanediol, nonanediol, tricyclo[5.2.1.0$^{2,6}$]decanedimethanol, cyclohexane-1,4-dimethanol, decalin-2,6-dimethanol, norbornane dimethanol, pentacyclopentadecanedimethanol, cyclopentane-1,3-dimethanol, spiroglycol, isosorbide, isomannide, isoidide, hydroquinone, resorcinol, dihydroxynaphthalene, 2,2-bis(4-hydroxyphenyl)propane, 2,2-bis(3-methyl-4-hydroxyphenyl) propane, 1,1-bis(4-hydroxyphenyl)-1-phenylethane, 1,3-bis (2-(4-hydroxyphenyl)-2-propyl)benzene, 1,1-bis(4-hydroxyphenyl)-3,3,5-trimethylcyclohexane, 1,1-bis(4-hydroxyphenyl)cyclohexane, bis(4-hydroxyphenyl) diphenylmethane, 1,1-bis(4-hydroxyphenyl)decane, bis(4-hydroxyphenyl)sulfide, bis(4-hydroxy-3-methylphenyl) sulfide, biphenol, 9,9-bis(4-hydroxyphenyl)fluorene, 9,9-bis (4-hydroxy-3-methylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl) fluorene, 9,9-bis(4-(2-hydroxyethoxy)-3-methylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene, bis(4-hydroxyphenyl)sulfone, bis(4-(2-hydroxyethoxy)phenyl)sulfone, 10,10-bis(4-hydroxyphenyl)anthrone, 2,2'-bis(2-hydroxyethoxy)-1,1'-binaphthyl, 2,2'-bis(2-hydroxyethoxy)-3,3'-diphenyl-1,1'-binaphthyl, 2,2'-bis(2-hydroxyethoxy)-6,6'-diphenyl-1,1'-binaphthyl, 2,2'-bis(2-hydroxyethoxy)-7,7'-diphenyl-1,1'-binaphthyl, 2,2'-bis(2-hydroxyethoxy)-3,3'-dimethyl-1,1'-binaphthyl, 2,2'-bis(2-hydroxyethoxy)-6,6'-dimethyl-1,1'-binaphthyl, 2,2'-bis(2-hydroxyethoxy)-7,7'-dimethyl-1,1'-binaphthyl, 1,1'-bi-2-naphthol, 2,2'-dihydroxy-3,3'-diphenyl-1,1'-binaphthyl, 2,2'-dihydroxy-6,6'-diphenyl-1,1'-binaphthyl, 2,2'-dihydroxy-7,7'-diphenyl-1,1'-binaphthyl, 9,9-bis(4-(2-hydroxyethoxy)-1-naphthyl)fluorene, 9,9-bis (4-(2-hydroxypropoxy)-1-naphthyl)fluorene, 9,9-bis(6-(2-hydroxyethoxy)-2-naphthyl)fluorene, 9,9-bis(6-(2-hydroxypropoxy)-2-naphthyl)fluorene, 9,9-bis(4-hydroxy-1-naphthyl)fluorene, and 9,9-bis(6-hydroxy-2-naphthyl) fluorene, and these may be used alone or in combination of two or more.

<<Thermoplastic Resin (B)>>

The thermoplastic resin (B) in the present invention contains a structural unit represented by the above formula (2).

In the above formula (2), $R^5$, $R^6$, and $R^8$ each independently represent a hydrogen atom or a hydrocarbon group having 1 to 20 carbon atoms, and examples of the hydrocarbon group include an alkyl group, a cycloalkyl group, and aryl group.

Examples of the alkyl group include methyl group, ethyl group, propyl group, isopropyl group, butyl group, and t-butyl group, and the methyl group is preferred.

Examples of the cycloalkyl group include cyclopropyl group, cyclobutyl group, cyclopentyl group, cyclohexyl group, and bicyclo[1.1.1]pentanyl group.

Examples of the aryl group include phenyl group, tolyl group, naphthyl group, and xylyl group, and the phenyl group is preferred.

$R^5$ to $R^8$ are each independently preferably a hydrogen atom, a methyl group, or a phenyl group, $R^5$ and $R^6$ are each independently more preferably a hydrogen atom or a phenyl group, and $R^7$ and $R^8$ are more preferably hydrogen atoms.

In the above formula (2), $L^3$ and $L^4$ each independently represent a divalent linking group, for example, an alkylene group having 1 to 4 carbon atoms, and represent preferably an ethylene group or a propylene group, and more preferably an ethylene group.

In the above formula (2), m and n each independently represent an integer of 0 or more, preferably 0 to 2, and more preferably 1.

As the thermoplastic resin (A), the polycarbonate resin or the polyester carbonate resin is preferred.

<<Diol Component Used in the Unit Represented by the Above Formula (2)>>

As the diol component used in the unit represented by formula (2) of the thermoplastic resin of the present invention, a raw material represented by formula (d) is mainly preferably used.

[Chemical 12]

(d)

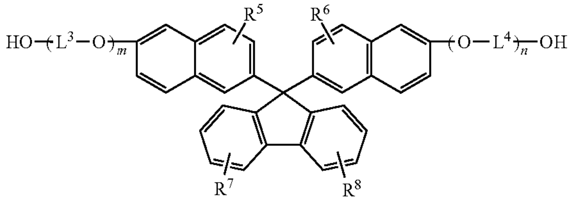

In the formula (d) of the diol component that is the raw material of the above formula (2), $L^3$, $L^4$, m, n, and $R^5$ to $R^8$ are the same as those in the above formula (2).

Specific examples of the above formula (d) include 9-bis(4-(hydroxymethoxy)-3-methylphenyl)fluorene, 9,9-bis(4-(hydroxymethoxy)phenyl)fluorene, 9,9-bis(4-(hydroxymethoxy)-3-phenylphenyl)fluorene, 9,9-bis(4-(3-hydroxypropoxy)-3-methylphenyl)fluorene, 9,9-bis(4-(3-hydroxypropoxy)-3-phenylphenyl) fluorene, 9,9-bis(4-(3-hydroxypropoxy)phenyl)fluorene, 9,9-bis(4-(2-hydroxyethoxy)-3-methylphenyl)fluorene, 9,9-bis(4-(2-hydroxyethoxy)-3-phenylphenyl)fluorene, and 9,9-bis(4-(2-hydroxyethoxy)phenyl)fluorene, and among them, 9,9-bis(4-(3-Hydroxypropoxy)-3-phenylphenyl)fluorene, 9,9-bis(4-(3-hydroxypropoxy)phenyl)fluorene, 9,9-bis(4-(2-hydroxyethoxy)-3-phenylphenyl)fluorene, and 9,9-bis(4-(2-hydroxyethoxy)phenyl)fluorene are preferred, and 9,9-bis(4-(2-hydroxyethoxy)phenyl)fluorene is more preferred.

<<Copolymerization Components Other than the Above Formula (2)>>

The thermoplastic resin (B) in the present invention has the structural unit represented by the above formula (2), but may contain other structural units within a range that does not impair the effects of the present invention. Proportion of the structural unit represented by the above formula (2) in the thermoplastic resin (B) in the present invention is preferably 70 mol % or more, and more preferably 80 mol % or more. As other repeating units, polycarbonate, polyester, and polyester carbonate are preferred, and the dicarboxylic acid component and the diol component constituting them are shown below.

Other dicarboxylic acid components and diol components that may be contained in the thermoplastic resin (B) in the present invention are shown below. Examples of the dicarboxylic acid components include the aliphatic dicarboxylic acid components such as malonic acid, succinic acid, glutaric acid, adipic acid, pimelic acid, suberic acid, azelaic acid, methylmalonic acid, and ethylmalonic acid, the monocyclic aromatic dicarboxylic acid components such as phthalic acid, isophthalic acid, and terephthalic acid, the polycyclic aromatic dicarboxylic acid components such as 2,6-naphthalenedicarboxylic acid, 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid, phenanthrenedicarboxylic acid, 9,9-bis(carboxymethyl)fluorene, 9,9-bis(2-carboxyethyl)fluorene, 9,9-bis(1-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-methylpropyl)fluorene, 9,9-bis(2-carboxybutyl) fluorene, 9,9-bis(2-carboxy-1-methylbutyl)fluorene, 9,9-bis(5-carboxypentyl)fluorene, and 9,9-bis(carboxycyclohexyl) fluorene, and the alicyclic dicarboxylic acid components such as 1,4-cyclohexanedicarboxylic acid and 2,6-decalinedicarboxylic acid, and among them, isophthalic acid, terephthalic acid, 2,6-naphthalenedicarboxylic acid, and 9,9-bis(2-carboxyethyl)fluorene are preferred, and terephthalic acid is more preferred. These may be used alone or in combination of two or more. Further, as the ester-forming derivative, acid chlorides and esters such as methyl esters, ethyl esters and phenyl esters may be used.

Examples of the diol components include ethylene glycol, propanediol, butanediol, pentanediol, hexanediol, heptanediol, octanediol, nonanediol, tricyclo[5.2.1.$0^{2,6}$]decanedimethanol, cyclohexane-1,4-dimethanol, decalin-2,6-dimethanol, norbornane dimethanol, pentacyclopentadecanedimethanol, cyclopentane-1,3-dimethanol, spiroglycol, isosorbide, isomannide, isoidide, hydroquinone, resorcinol, dihydroxynaphthalene, 2,2-bis(4-hydroxyphenyl)propane, 2,2-bis(3-methyl-4-hydroxyphenyl) propane, 1,1-bis(4-hydroxyphenyl)-1-phenylethane, 1,3-bis(2-(4-hydroxyphenyl)-2-propyl)benzene, 1,1-bis(4-hydroxyphenyl)-3,3,5-trimethylcyclohexane, 1,1-bis(4-hydroxyphenyl)cyclohexane, bis(4-hydroxyphenyl) diphenylmethane, 1,1-bis(4-hydroxyphenyl)decane, bis(4-hydroxyphenyl)sulfide, bis(4-hydroxy-3-methylphenyl) sulfide, biphenol, 9,9-bis(4-hydroxyphenyl)fluorene, 9,9-bis(4-hydroxy-3-methylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl) fluorene, 9,9-bis(4-(2-hydroxyethoxy)-3-methylphenyl) fluorene, 9,9-bis(4-(2-hydroxyethoxy)-3-cyclohexylphenyl) fluorene, 9,9-bis(4-(2-hydroxyethoxy)-3-phenylphenyl) fluorene, bis(4-hydroxyphenyl)sulfone, bis(4-(2-hydroxyethoxy)phenyl)sulfone, and 10,10-bis(4-hydroxyphenyl)anthrone, and these may be used alone or in combination of two or more.

<<Method for Producing Thermoplastic Resin (A) and Thermoplastic Resin (B)>>

The thermoplastic resin of the present invention is produced, for example, by a method of reacting a diol component with a carbonate precursor such as phosgene or a diester carbonate, or a method of reacting the diol component with the dicarboxylic acid or the ester-forming derivative thereof. Specific examples are shown below.

<<Method for Producing Polyester Resin>>

The polyester resin is generally produced by subjecting the diol component and the dicarboxylic acid or the ester-forming derivative thereof to an esterification reaction or transesterification reaction, and subjecting the resulting reaction product to a polycondensation reaction to obtain a high molecular weight product having a desired molecular weight.

As a polymerization method, it can be produced by selecting an appropriate method from known methods such as a direct polymerization method, a melt polymerization method such as a transesterification method, a solution polymerization method, and an interfacial polymerization method.

When using the interfacial polymerization method, a method is preferred in which a solution (an organic phase) obtained by dissolving a dicarboxylic acid chloride in an organic solvent immiscible with water is mixed with an alkaline aqueous solution (an aqueous phase) containing an aromatic diol and a polymerization catalyst, and a polymerization reaction is carried out with stirring for 0.5 to 8 hours at a temperature of 50° C. or less, preferably 25° C. or less.

As a solvent used for the organic phase, a solvent that is immiscible with water and dissolves the polyester resin of the present invention is preferred. Preferred examples of such a solvent include chlorinated solvents such as methylene chloride, 1,2-dichloroethane, chloroform, and chlorobenzene, and aromatic hydrocarbon solvents such as toluene, benzene, and xylene, and the methylene chloride is more preferred because it is easy to use in production.

Preferred examples of the alkaline aqueous solution used for the water phase include aqueous solutions of sodium hydroxide, potassium hydroxide, and sodium carbonate.

In a reaction by the melt polymerization method, the diol component and the dicarboxylic acid component or a diester thereof are usually mixed and reacted at a temperature of preferably 120° C. to 350° C., more preferably 150° C. to 300° C., and still more preferably 180° C. to 270° C. The degree of pressure reduction can be changed stepwise and finally reduced to 0.13 kPa or less to distill the resulting hydroxy compounds such as water and alcohol out of the system. The reaction time is usually preferably about 1 to 10 hours.

In addition, a transesterification catalyst and a polymerization catalyst can be used to speed up a polymerization rate in the melt polymerization method. As the transesterification catalyst, those known per se can be used, and for example, compounds containing manganese, magnesium, titanium, zinc, aluminum, calcium, cobalt, sodium, lithium, and lead elements can be preferably used. More preferred specific examples of the transesterification catalyst include oxides, acetates, carboxylates, hydrides, alcoholates, halides, carbonates, and sulfates containing these elements. Among them, compounds such as oxides, acetates, and alcoholates of manganese, magnesium, zinc, titanium, and cobalt are still more preferred from the viewpoint of melt stability and hue of the polyester resin and a small amount of resin-insoluble foreign matter. These compounds can be used in combination of two or more. As the polymerization catalyst, those known per se can be used, and for example, antimony compounds, titanium compounds, germanium compounds, tin compounds, or aluminum compounds are preferred. Preferred examples of such compounds include oxides, acetates, carboxylates, hydrides, alcoholates, halides, carbonates, and sulfates of antimony, titanium, germanium, tin, and aluminum. Further, these compounds can be used in combination of two or more.

An amount of the polymerization catalyst to be used is preferably in a range of $1\times10^{-8}$ to $1\times10^{-3}$ mol per mole of total monomer units.

A terminal blocking agent may be used for the polyester resin used in the present invention in order to adjust the molecular weight and improve thermal stability. Preferred examples of the terminal blocking agent include monofunctional hydroxy compounds, epoxy compounds, oxazoline compounds, isocyanate compounds, carbodiimide compounds, and ketene imine compounds.

The polyester resin used in the present invention may contain a copolymer component other than the diol component, the dicarboxylic acid component, and an ester-forming derivative of the dicarboxylic acid component.

<<Method for Producing Polycarbonate Resin>>

The polycarbonate resin is generally produced by reacting a dihydroxy compound with the carbonate precursor such as the diester carbonate.

The transesterification reaction using a carbonic acid diester as the carbonate precursor is carried out by a method in which a predetermined proportion of a dihydroxy component and the carbonic acid diester are heated and stirred under an inert gas atmosphere to distill off the resulting alcohols or phenols. Although the reaction temperature varies depending on the boiling point and the like of the alcohols or phenols to be produced, it is usually in a range of 120° C. to 300° C. The reaction is completed under reduced pressure from an initial stage while the resulting alcohols or phenols are distilled off. Further, the terminal blocking agent, an antioxidant, or the like may be added as needed.

Examples of the carbonic acid diester used in the transesterification reaction include esters having an optionally substituted aryl group, aralkyl group, or the like having 6 to 12 carbon atoms. Specific examples of the esters include diphenyl carbonate, ditolyl carbonate, bis(chlorophenyl) carbonate, and m-cresyl carbonate. Among them, the diphenyl carbonate is particularly preferred. An amount of diphenyl carbonate to be used is preferably 0.95 to 1.10 mol, and more preferably 0.98 to 1.04 mol per mole of total dihydroxy compounds.

In the melt polymerization method, the polymerization catalyst can be used in order to increase the polymerization rate, and examples of the polymerization catalyst include alkali metal compounds, alkaline earth metal compounds, and nitrogen-containing compounds.

As such compounds, organic acid salts, inorganic salts, oxides, hydroxides, hydrides, alkoxides, quaternary ammonium hydroxides, and the like of alkali metals and alkaline earth metals are preferably used, and these compounds can be used alone or in combination.

Examples of the alkali metal compounds include sodium hydroxide, potassium hydroxide, cesium hydroxide, lithium hydroxide, sodium hydrogen carbonate, sodium, carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt, and dilithium salt of bisphenol A, and sodium salt, potassium salt, cesium salt, and lithium salt of phenol.

Examples of the alkaline earth metal compounds include magnesium hydroxide, calcium hydroxide, strontium hydroxide, barium hydroxide, magnesium carbonate, calcium, carbonate, strontium carbonate, barium carbonate, magnesium diacetate, calcium diacetate, strontium diacetate, and barium diacetate.

Examples of the nitrogen-containing compounds include quaternary ammonium hydroxides having an alkyl or aryl group, such as tetramethylammonium hydroxide, tetraethylammonium hydroxide, tetrapropylammonium hydroxide, tetrabutylammonium hydroxide, and trimethylbenzylammonium hydroxide. Bases or basic salts such as tetramethylammonium borohydride, tetrabutylammonium borohydride, tetrabutylammonium tetraphenylborate, and tetraphenylammonium tetraphenylborate are exemplified.

Examples of other transesterification catalysts include salts of zinc, tin, zirconium, lead, titanium, germanium, antimony, and osmium, and for example, zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, and titanium(IV) tetrabutoxide are used. Catalysts used in WO 2011/010741 A and JP-A-2017-179323 may be used.

Furthermore, a catalyst containing aluminum or a compound thereof and a phosphorus compound may be used. In that case, it may be $8\times10^{-5}$ mol or more, $9\times10^{-5}$ mol or more, and $1\times10^{-4}$ mol or more per mole of total monomer units to be used, and can be used at $1\times10^{-3}$ mol or less, $8\times10^{-4}$ mol or less, and $6\times10^{-4}$ mol or less.

Examples of aluminum salts include organic acid salts and inorganic acid salts of aluminum. Examples of organic acid salts of aluminum include carboxylates of aluminum, and specific examples include aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, and aluminum salicylate. Examples of inorganic acid salts of aluminum include aluminum chloride, aluminum hydroxide, aluminum hydroxychloride, aluminum carbonate, aluminum phosphate, and aluminum phosphonate. Examples of aluminum chelate compounds include aluminum acetylacetonate, aluminum acetylacetate, aluminum ethylacetoacetate, and aluminum ethylacetoacetate diiso-propoxide.

Examples of the phosphorus compound include phosphonic acid-based compounds, phosphinic acid-based compounds, phosphine oxide-based compounds, phosphonous acid-based compounds, phosphinous acid-based compounds, and phosphine-based compounds. Among them, phosphonic acid-based compounds, phosphinic acid-based compounds, and phosphine oxide-based compounds are preferred, and phosphonic acid-based compounds are particularly preferred.

An amount of these polymerization catalysts to be used is preferably 0.1 μmol to 500 μmol, more preferably 0.5 μmol to 300 μmol, and still more preferably 1 μmol to 100 μmol per mole of the dihydroxy component.

Further, a catalyst deactivator can be added in the latter stage of the reaction. As the catalyst deactivator to be used, known catalyst deactivators are effectively used, and among these, ammonium salts and phosphonium salts of sulfonic acid are preferred. Furthermore, salts of dodecylbenzenesulfonic acid such as dodecylbenzenesulfonic acid tetrabutylphosphonium salt and salts of p-toluenesulfonic acid such as p-toluenesulfonic acid tetrabutylammonium salt are preferred.

Further, as sulfonic acid esters, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, and the like are preferably used. Among them, dodecylbenzenesulfonic acid tetrabutylphosphonium salt is most preferably used.

When at least one polymerization catalyst selected from the alkali metal compounds and/or the alkaline earth metal compounds is used, an amount of these catalyst deactivators to be used is in a proportion of preferably 0.5 to 50 mol, more preferably 0.5 to 10 mol, and still more preferably 0.8 to 5 mol per mole of the catalyst.

<<Method for Producing Polyester Carbonate Resin>>

The polyester carbonate resin is generally produced by a method of subjecting a dihydroxy compound to a polycondensation reaction with the carbonate precursor such as the diester carbonate and the dicarboxylic acid or the ester-forming derivative thereof.

Reaction of the dihydroxy compound, the dicarboxylic acid or its acid chloride with phosgene is carried out in a non-aqueous system in the presence of an acid binder and the solvent. As the acid binder, for example, pyridine, dimethylaminopyridine, tertiary amine, or the like is used. As the solvent, for example, a halogenated hydrocarbon such as methylene chloride, chlorobenzene, or the like is used. As a molecular weight modifier, it is desirable to use the terminal blocking agent such as phenol or p-tert-butylphenol. The reaction temperature is usually 0° C. to 40° C., and the reaction time is preferably several minutes to 5 hours.

In the transesterification reaction, the dihydroxy compound, the dicarboxylic acid or the diester thereof, and a bis aryl carbonate are mixed under an inert gas atmosphere and reacted at a temperature of usually 120° C. to 350° C., preferably 150° C. to 300° C. under reduced pressure. The degree of pressure reduction is changed stepwise, and finally the pressure is reduced to 133 Pa or less to distill the resulting alcohols out of the system. The reaction time is usually about 1 to 4 hours. Further, the polymerization catalyst can be used in order to promote the reaction in the transesterification reaction. As such a polymerization catalyst, it is preferable to use the alkali metal compound, the alkaline earth metal compound, or a heavy metal compound as a main component and, if necessary, a nitrogen-containing basic compound as a subcomponent.

Examples of the alkali metal compounds include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium salt, potassium salt, lithium salt of bisphenol A, sodium benzoate, potassium benzoate, and lithium benzoate. Examples of the alkaline earth metal compounds include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Examples of the nitrogen-containing basic compound include tetramethylammonium hydroxide, tetraethylammonium hydroxide, tetrabutylammonium hydroxide, trimethylbenzylammonium hydroxide, trimethylamine, triethylamine, dimethylbenzylamine, triphenylamine, and dimethylaminopyridine.

As the other transesterification catalysts, the catalysts exemplified as the transesterification catalysts in the above-described method for producing polycarbonate can be used in the same manner.

After completion of the polymerization reaction, the catalyst may be removed or deactivated in order to maintain the thermal stability and hydrolytic stability. In general, a method of deactivating the catalyst by adding a known acidic substance is preferably carried out. Preferred specific examples of these substances include esters such as butyl benzoate, aromatic sulfonic acids such as p-toluenesulfonic acid, aromatic sulfonic acid esters such as butyl p-toluenesulfonate and hexyl p-toluenesulfonate, phosphoric acids such as phosphorous acid, phosphoric acid, and phosphonic acid, phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite, phosphoric acid esters such as triphenyl phosphate, diphenyl phosphate, monophenyl phosphate, dibutyl phosphate, dioctyl phosphate, monooctyl phosphate, phosphonic acids such as diphenylphosphonic acid, dioctylphosphonic acid, and dibutylphosphonic acid, phosphonic acid esters such as diethyl phenylphosphonate, phosphines such as triphenylphosphine and bis(diphenylphosphino)ethane, boric acids such as boric acid and phenylboric acid, aromatic sulfonates such as tetrabutylphosphonium dodecylbenzenesulfonate, organic halides such as stearic chloride, benzoyl chloride, and p-toluenesulfonic acid chloride, alkyl sulfates such as dimethyl sulfate, and organic halides such as benzyl chloride. These deactivators are used in an amount of 0.01 to 50 times mol, preferably 0.3 to 20 times mol with respect to an amount of the catalyst. If it is less than 0.01 times mol with respect to the amount of the catalyst, deactivation effect is insufficient, which is not preferred. Further, if it is more than 50 times mol with respect to the amount of the catalyst, the heat resistance is reduced and a molded article tends to be colored, which is not preferred.

After deactivating the catalyst, a step of devolatilizing and removing low boiling point compounds in the thermoplastic resin at a pressure of 13.3 Pa to 133 Pa and a temperature of 200° C. to 320° C. may be provided.

<<Thermoplastic Resin Composition>>

A thermoplastic resin composition of the present invention contains the thermoplastic resin (A) and the thermoplastic resin (B). The thermoplastic resin composition of the present invention may contain other resins within the range that does not impair the effects of the present invention. A total proportion of the thermoplastic resin (A) and the thermoplastic resin (B) in the thermoplastic resin composition of the present invention is preferably 70% by mass or more, and more preferably 90% by mass.

In the thermoplastic resin composition of the present invention, the mass ratio (A:B) of the thermoplastic resin (A) and the thermoplastic resin (B) is preferably 1:99 to 99:1, more preferably 20:80 to 99:1, still more preferably 30:70 to 99:1, and particularly preferably 60:40 to 90:10.

Within the above range, a thermoplastic resin having a high impact strength while having a high refractive index and a low Abbe number can be obtained.

The thermoplastic resin composition of the present invention can be used as a resin composition by appropriately adding additives such as mold release agents, heat stabilizers, ultraviolet absorbers, bluing agents, antistatic agents, flame retardants, plasticizers, fillers, and antioxidants as needed. Preferred specific examples of the mold release agents and the heat stabilizers include those described in WO 2011/010741 A1.

As particularly preferred mold release agents, monoglyceride stearate, triglyceride stearate, pentaerythritol tetrastearate, and a mixture of triglyceride stearate and stearyl stearate are preferably used. Further, an amount of the ester in the mold release agent is preferably 90% by mass or more, and more preferably 95% by mass or more, when the mold release agent is 100% by mass. Furthermore, the mold release agent to be blended in the thermoplastic resin composition is in the range of preferably 0.005 to 2.0 parts by mass, more preferably 0.01 to 0.6 parts by mass, and still more preferably 0.02 to 0.5 parts by mass with respect to 100 parts by mass of the thermoplastic resin composition.

The heat stabilizers include phosphorus-based heat stabilizers, sulfur-based heat stabilizers, and hindered phenol-based heat stabilizers.

Further, as particularly preferred phosphorus-based heat stabilizers, tris(2,4-di-tert-butylphenyl)phosphite, bis(2,6-di-tert-butyl-4-methylphenyl)pentaerythritol diphosphite, and tetrakis(2,4-di-tert-butylphenyl)-4,4'-biphenylenediphosphonite are used. Further, an amount of the phosphorus-based heat stabilizer to be blended in the thermoplastic resin composition is preferably 0.001 to 0.2 parts by mass with respect to 100 parts by mass of the thermoplastic resin composition.

Further, a particularly preferred sulfur-based heat stabilizer is pentaerythritol-tetrakis(3-laurylthiopropionate). Furthermore, the content of the sulfur-based heat stabilizer in the thermoplastic resin composition is preferably 0.001 to 0.2 parts by mass with respect to 100 parts by mass of the thermoplastic resin composition.

Further, preferred hindered phenol-based heat stabilizers include octadecyl-3-(3,5-di-tert-butyl-4-hydroxyphenyl) propionate and pentaerythritol-tetrakis[3-(3,5-di-tert-butyl-4-hydroxyphenyl)propionate].

An amount of the hindered phenol-based heat stabilizer to be blended in the thermoplastic resin composition is preferably 0.001 to 0.3 parts by mass with respect to 100 parts by mass of the thermoplastic resin composition.

The phosphorus-based heat stabilizer and the hindered phenol-based heat stabilizer can also be used in combination.

As the ultraviolet absorber, at least one ultraviolet absorber selected from the group consisting of benzotriazole-based ultraviolet absorbers, benzophenone-based ultraviolet absorbers, triazine-based ultraviolet absorbers, cyclic iminoester-based ultraviolet absorbers, and cyanoacrylate-based ultraviolet absorbers is preferred.

The benzotriazole-based ultraviolet absorbers are more preferably 2-(2-hydroxy-5-tert-octylphenyl) benzotriazole and 2,2'-methylenebis[4-(1,1,3,3-tetramethylbutyl)-6-(2H-benzotriazol-2-yl)phenol].

The benzophenone-based ultraviolet absorbers include 2-hydroxy-4-n-dodecyloxybenzophenone and 2-hydroxy-4-methoxy-2'-carboxybenzophenone.

Examples of the triazine-based ultraviolet absorbers include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

As the cyclic iminoester-based ultraviolet absorbers, 2,2'-p-phenylenebis(3,1-benzoxazin-4-one) is particularly suitable.

Examples of the cyanoacrylate-based ultraviolet absorbers include 1,3-bis-[(2'-cyano-3',3'-diphenylacryloyl)oxy]-2,2-bis[(2-cyano-3,3-diphenyl acryloyl)oxy]methyl)propane and 1,3-bis-[(2-cyano-3,3-diphenylacryloyl) oxy]benzene.

An amount of the ultraviolet absorber to be blended is preferably 0.01 to 3.0 parts by mass with respect to 100 parts by mass of the thermoplastic resin composition, and within such a blending amount range, it is possible to impart sufficient weather resistance to the molded article of the thermoplastic resin composition depending on the application.

Examples of the antioxidants include triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl) benzene, N,N-hexamethylene bis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl) isocyanurate, and 3,9-bis{1,1-dimethyl-2-[β-(3-tert-butyl-4-hydroxy-5-methylphenyl)propionyloxy] ethyl}-2,4,8,10-tetraoxaspiro(5,5) undecane.

An amount of the antioxidant to be blended is preferably 0.50 parts by mass or less, more preferably 0.05 to 0.40 parts by mass, still more preferably 0.05 to 0.20 parts by mass or 0.10 to 0.40 parts by mass, and particularly preferably 0.20 to 0.40 parts by mass with respect to 100 parts by mass of the thermoplastic resin composition.

<<Method for Producing Thermoplastic Resin Composition>>

A method for producing the thermoplastic resin composition of the present invention is not particularly limited, and the thermoplastic resin composition can be produced by, for example, any one of a method of mixing solids of the thermoplastic resin (A) and the thermoplastic resin (B) and kneading them with a kneading machine, a method of adding a solid thermoplastic resin (B) to a molten thermoplastic resin (A) and kneading them, a method of adding a solid thermoplastic resin (A) to the solid thermoplastic resin (B) and kneading them, and a method of mixing and kneading the molten thermoplastic resin (A) and a molten thermoplastic resin (B).

Kneading may be performed either continuously or batchwise. If the kneading machine is a continuous type, an extruding machine is suitable, and if it is a batch type, a Labo Plastomill, and a kneader are preferably used.

<<Physical Properties of Thermoplastic Resin Composition>>

The refractive index of the thermoplastic resin composition of the present invention is 1.645 or more, may be 1.650 or more, 1.655 or more, 1.660 or more, 1.665 or more, 1.667 or more, or 1.670 or more, is 1.690 or less, and may be 1.685 or less or 1.680 or less, when measured at a temperature of 20° C. and a wavelength of 589 nm. For example, the thermoplastic resin of the present invention has a refractive index of 1.645 to 1.690, preferably 1.650 to 1.690, more preferably 1.655 to 1.690, still more preferably 1.660 to 1.690, particularly preferably 1.665 to 1.690, and most preferably 1.667 to 1.685. When the refractive index is equal to or higher than the lower limit, spherical aberration of an optical lens can be reduced, and a focal length of the optical lens can be shortened.

The Abbe number of the thermoplastic resin composition of the present invention may be 10.0 or more, 11.0 or more, 12.0 or more, 13.0 or more, or 14.0 or more, and 30.0 or less, 29.0 or less, 28.0 or less, 27.0 or less, 26.0 or less, or 25.0 or less. For example, the Abbe number of the thermoplastic resin composition of the present invention may be 15.0 to 25.0, 16.0 to 24.0, 17.0 to 23.0, or 18.0 to 22.0.

Here, the Abbe number is calculated using the following formula from refractive indices at a temperature of 20° C., and wavelengths of 486.13 nm, 587.56 nm, and 656.27 nm.

$\nu d=(nd-1)/(nF-nC)$ nd: refractive index at a wavelength of 587.56 nm nF: refractive index at a wavelength of 486.13 nm nC: refractive index at a wavelength of 656.27 nm An absolute value of an orientation birefringence (Δn) of the thermoplastic resin composition of the present invention is preferably $4.6\times10^{-3}$ or less, more preferably $4.4\times10^{-3}$ or less, and still more preferably $4.2\times10^{-3}$ or less. When the orientation birefringence is within the above range, chromatic aberration is not significantly affected, so that performance as optically designed can be maintained. The orientation birefringence (Δn) is measured at the wavelength of 589 nm after stretching twice a 100 μm thick cast film obtained from the thermoplastic resin at Tg+10° C.

The thermoplastic resin composition of the present invention preferably has a haze of 2% or less, more preferably 1% or less, and still more preferably 0.5% or less at a thickness of 3 mm. When the haze is within the above range, a range of use as various transparent members is not limited, which is preferred.

A viscosity average molecular weight of the thermoplastic resin composition of the present invention may be 5,000 or more, 6,000 or more, or 7,000 or more, and 25,000 or less, 20,000 or less, or 15,000 or less when measured by a method described in Examples. For example, the viscosity average molecular weight of the thermoplastic resin composition of the present invention may be 6,000 to 20,000, or 7,000 to 15,000.

Water absorption rate of the thermoplastic resin composition of the present invention after being immersed at 23° C. for 24 hours may be 0.01% by mass or more, 0.04% by mass or more, 0.07% by mass or more, or 0.10% by mass or more, and may be 0.30% by mass or less, 0.25% by mass or less, or 0.20% by mass or less. For example, the water absorption rate of the thermoplastic resin composition of the present invention is preferably 0.01% by mass to 0.30% by mass, more preferably 0.04% by mass to 0.25% by mass, still more preferably 0.07% by mass to 0.25% by mass, and particularly preferably 0.07% by mass to 0.20% by mass. When the water absorption rate is within the above range, change in optical properties due to water absorption is small, which is thus preferred.

The glass transition temperature of the thermoplastic resin composition of the present invention may be 130° C. or higher, 135° C. or higher, 140° C. or higher, or 145° C. or higher, and may be 170° C. or lower, 165° C. or lower, or 160° C. or lower. The glass transition temperature of the thermoplastic resin composition of the present invention is preferably 130° C. to 170° C., more preferably 135° C. to 165° C., still more preferably 140° C. to 160° C., and particularly preferably 145° C. to 160° C. When the glass transition temperature is within the above range, balance between the heat resistance and moldability is excellent, which is thus preferred.

The thermoplastic resin composition of the present invention has a value of unnotched Charpy impact strength measured according to ISO179 of preferably 25 J/m$^2$ or more, more preferably 27 J/m$^2$ or more, and particularly preferably 29 J/m$^2$ or more. Note that when the unnotched Charpy impact strength is within the above range, it is possible to suppress occurrence of breakage of sprues and runners in continuous molding.

<<Optical Member>>

An optical member of the present invention contains the above thermoplastic resin composition. Such an optical member is not particularly limited as long as it is an optical application in which the thermoplastic resin composition is useful, and examples of the optical member include optical discs, transparent conductive substrates, optical cards, sheets, films, optical fibers, lenses, prisms, optical films, substrates, optical filters, and hard coat films.

Further, the optical member of the present invention may include a resin composition containing the thermoplastic resin composition described above, and additives such as heat stabilizers, plasticizers, light stabilizers, polymerization metal deactivators, flame retardants, lubricants, antistatic agents, surfactants, antibacterial agents, ultraviolet absorbers, and mold release agents can be blended in the resin composition as needed.

<<Optical Lens>>

The optical lens can be particularly mentioned as the optical member of the present invention. Examples of such an optical lens include imaging lenses for mobile phones, smart phones, tablet terminals, personal computers, digital cameras, video cameras, vehicle-mounted cameras, surveillance cameras, and the like, and sensing cameras such as TOF cameras.

When the optical lens of the present invention is produced by injection molding, the molding is preferably carried out under the conditions of a cylinder temperature of 230° C. to 350° C. and a mold temperature of 70° C. to 180° C. More preferably, the molding is carried out under the conditions of the cylinder temperature of 250° C. to 300° C. and the mold temperature of 80° C. to 170° C. When the cylinder temperature is higher than 350° C., the thermoplastic resin composition is decomposed and colored, and when it is lower than 230° C., the melt viscosity is high and the molding tends to be difficult. Further, when the mold temperature is higher than 180° C., it tends to be difficult to remove a molded piece made of the thermoplastic resin composition from the mold. On the other hand, when the mold temperature is less than 70° C., the resin is hardened too quickly in the mold during molding, making it difficult to control a shape of the molded piece, and it tends to be difficult to sufficiently transfer shaping given to the mold.

The optical lens of the present invention is preferably formed in a shape of an aspherical lens as needed. Since the aspherical lens can make the spherical aberration substantially zero with a single lens, it is not necessary to eliminate the spherical aberration by combining a plurality of spherical lenses, and it is possible to reduce weight and molding cost. Therefore, the aspherical lens is particularly useful as a camera lens among optical lenses.

Further, the thermoplastic resin composition of the present invention is particularly useful as a material for the optical lens that is thin, small, and have a complicated shape, because of its high molding fluidity. As a specific lens size, the thickness of the central portion is 0.05 to 3.0 mm, more preferably 0.05 to 2.0 mm, and still more preferably 0.1 to 2.0 mm. Further, the diameter is 1.0 mm to 20.0 mm, more preferably 1.0 to 10.0 mm, and still more preferably 3.0 to 10.0 mm. Furthermore, it is preferable that the lens is a meniscus lens having a convex surface on one side and a concave surface on the other side as its shape.

A lens made of the thermoplastic resin of the present invention can be molded by any method such as mold molding, cutting, polishing, laser processing, electrical discharge machining, and etching. Among them, the mold molding is more preferable from the viewpoint of production cost.

EXAMPLES

The present invention will be described in more detail with the following examples, but the present invention is not limited thereto.

<<Evaluation Method>>

<Refractive Index>

A 3 mm thick disc of each thermoplastic resin composition was prepared, cut and polished, and then the refractive index nd (587.56 nm) was measured using a Kalnew precision refractometer KPR-2000 manufactured by Shimadzu Corporation.

<Abbe Number>

The measurement wavelength of the Abbe number was calculated using the following formula from the refractive indices of 486.13 nm, 587.56 nm, and 656.27 nm.

$\nu d=(nd-1)/(nF-nC)$ nd: refractive index at a wavelength of 587.56 nm nF: refractive index at a wavelength of 486.13 nm nC: refractive index at a wavelength of 656.27 nm <Unnotched Charpy Impact Strength>

Using a 4 mm thick prismatic molded piece obtained by injection molding, the unnotched Charpy impact strength was measured according to ISO179.

<Water Absorption Rate>

Using a 2 mm thick plate-shaped molded piece obtained by injection molding, the water absorption rate after immersion at 23° C. for 24 hours was measured according to ISO62.

<Haze (Hz)>

Using a 3 mm thick disc obtained by injection molding, the haze was measured with a Haze Meter NDH 2000 manufactured by Nippon Denshoku Industries Co., Ltd.

<Glass Transition Temperature (Tg)>

The glass transition temperature of the resulting thermoplastic resin composition was measured with a DSC Discovery DSC25 automatic type manufactured by TA Instruments Japan Co., Ltd. at a heating rate of 20° C./min. Samples were measured at 5 to 10 mg.

<Viscosity Average Molecular Weight (Mv)>

The viscosity average molecular weight of the thermoplastic resin composition was measured by the following method. A solution obtained by dissolving 0.7 g of the thermoplastic resin composition in 100 ml of methylene chloride was measured for specific viscosity (ηsp) of the solution at 20° C. Then, Mv calculated by the following formula was defined as the viscosity average molecular weight.

$\eta sp/c=[\eta]+0.45\times[\eta]^2c$ $[\eta]=1.23\times10^{-4}\times Mv^{0.83}$ ηsp: specific viscosity η: intrinsic viscosity c: constant (=0.7)

Mv: viscosity average molecular weight

<Absolute Value of Orientation Birefringence>

The thermoplastic resin composition was dissolved in methylene chloride, and then cast on a glass petri dish and sufficiently dried to prepare a cast film with a thickness of 100 μm. The film was stretched twice at Tg+10° C., and retardation (Re) at 589 nm was measured using an ellipsometer M-220 manufactured by JASCO Corporation to determine the absolute value of the orientation birefringence (|Δn|) from the following formula.

$|\Delta n|=|Re/d|$

Δn: orientation birefringence

Re: retardation (nm)

d: thickness (nm)

Synthesis Example

Synthesis Example 1 (Production of Thermoplastic Resin (A1))

18.1 parts by mass of 2,2'-bis(carboxymethoxy)-1,1'-binaphthyl, 18.9 parts by mass of 9,9-bis[6-(2-hydroxyethoxy)-2-naphthyl]fluorene, 7.5 parts by mass of 2,2'-bis(2-hydroxyethoxy)-1,1'-binaphthyl, 2.4 parts by mass of diphenyl carbonate (hereinafter may be abbreviated as DPC), $19.5\times10^{-3}$ parts by mass of aluminum acetylacetonate, and $42.7\times10^{-3}$ parts by mass of diethyl 3,5-di-tert-butyl-4-hydroxybenzylphosphonate were placed in a reaction vessel equipped with a stirrer and a distiller, and after purging with nitrogen three times, the jacket was heated to 200° C. to melt raw materials.

After complete dissolution, the pressure was reduced to 40 kPa over 20 minutes. Thereafter, the temperature was raised to 245° C., the pressure was reduced to 0.13 kPa or less, and the polymerization reaction was carried out until a predetermined stirring torque was reached. After completion of the reaction, the produced resin was extracted while being pelletized to obtain pellets of a thermoplastic resin (A1). The resulting thermoplastic resin (A1) had an Mv of 8,400 and a Tg of 155° C.

Synthesis Example 2 (Production of Thermoplastic Resin (B1))

36.0 parts by mass of 9,9-bis(4-(2-hydroxyethoxy)phenyl)fluorene, 3.5 parts by mass of dimethyl terephthalate, 13.7 parts by mass of DPC, and $4.3\times10^{-3}$ parts by mass of titanium tetrabutoxide were placed in a reaction vessel equipped with a stirrer and a distiller, and after purging with nitrogen three times, the jacket was heated to 200° C. to melt raw materials.

After complete dissolution, the pressure was reduced to 80 kPa over 20 minutes. Thereafter, the temperature was raised to 260° C., the pressure was reduced to 0.13 kPa or less, and the polymerization reaction was carried out until a predetermined stirring torque was reached. After completion of the reaction, the produced resin was extracted while being pelletized to obtain pellets of a thermoplastic resin (B1). The resulting thermoplastic resin (B1) had an Mv of 10,100 and a Tg of 149° C.

Synthesis Example 3 (Production of Thermoplastic Resin (B2))

43.9 parts by mass of 9,9-bis(4-(2-hydroxyethoxy)phenyl)fluorene, 22.3 parts by mass of DPC, and $6.7\times10^{-5}$ parts by mass of sodium hydrogen carbonate were placed in a reaction vessel equipped with a stirrer and a distiller, and after purging with nitrogen three times, the jacket was heated to 200° C. to melt raw materials.

After complete dissolution, the pressure was reduced to 80 kPa over 20 minutes. Thereafter, the temperature was raised to 260° C., the pressure was reduced to 0.13 kPa, and the polymerization reaction was carried out until a predetermined stirring torque was reached. After completion of the reaction, the produced resin was extracted while being pelletized to obtain pellets of a thermoplastic resin (B2). The resulting thermoplastic resin (B2) had an Mv of 9,400 and a Tg of 142° C.

Example 1

23.0 parts by mass of the thermoplastic resin (A1) produced in Synthesis Example 1 and 77.0 parts by mass of the thermoplastic resin (B1) produced in Synthesis Example 2 were well mixed, and then the thermoplastic resin (A1) and thermoplastic resin (B1) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 151° C. and a single peak in DSC measurement. Further, the Mv of the pellet was 9,700. The pellets were injection molded to obtain a 2 mm thick plate-shaped molded piece, a 3 mm thick disc, and a 4 mm thick prismatic molded piece. The molded body was transparent. Table 1 shows evaluation results.

Example 2

44.0 parts by mass of the thermoplastic resin (A1) produced in Synthesis Example 1 and 56.0 parts by mass of the thermoplastic resin (B1) produced in Synthesis Example 2 were well mixed, and then the thermoplastic resin (A1) and thermoplastic resin (B1) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 152° C. and a single peak in DSC measurement. Further, the Mv of the pellet was 9,400. The pellets were injection molded to obtain a 2 mm thick plate-shaped molded piece, a 3 mm thick disc, and a 4 mm thick prismatic molded piece. The molded body was transparent. Table 1 shows the evaluation results.

Example 3

64.0 parts by mass of the thermoplastic resin (A1) produced in Synthesis Example 1 and 36.0 parts by mass of the thermoplastic resin (B1) produced in Synthesis Example 2 were well mixed, and then the thermoplastic resin (A1) and thermoplastic resin (B1) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 153° C. and a single peak in DSC measurement. Further, the Mv of the pellet was 9,000. The pellets were injection molded to obtain a 2 mm thick plate-shaped molded piece, a 3 mm thick disc, and a 4 mm thick prismatic molded piece. The molded body was transparent. Table 1 shows the evaluation results.

Example 4

86.0 parts by mass of the thermoplastic resin (A1) produced in Synthesis Example 1 and 14.0 parts by mass of the thermoplastic resin (B1) produced in Synthesis Example 2 were well mixed, and then the thermoplastic resin (A1) and thermoplastic resin (B1) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 154° C. and a single peak in DSC measurement. Further, the Mv of the pellet was 8,600. The pellets were injection molded to obtain a 2 mm thick plate-shaped molded piece, a 3 mm thick disc, and a 4 mm thick prismatic molded piece. The molded body was transparent. Table 1 shows the evaluation results.

Example 5

95.0 parts by mass of the thermoplastic resin (A1) produced in Synthesis Example 1 and 5.0 parts by mass of the thermoplastic resin (B1) produced in Synthesis Example 2 were well mixed, and then the thermoplastic resin (A1) and thermoplastic resin (B1) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 155° C. and a single peak in DSC measurement. Further, the Mv of the pellet was 8,500. The pellets were injection molded to obtain a 2 mm thick plate-shaped molded piece, a 3 mm thick disc, and a 4 mm thick prismatic molded piece. The molded body was transparent. Table 1 shows the evaluation results.

Example 6

44.0 parts by mass of the thermoplastic resin (A1) produced in Synthesis Example 1 and 56.0 parts by mass of the thermoplastic resin (B2) produced in Synthesis Example 3 were well mixed, and then the thermoplastic resin (A1) and thermoplastic resin (B2) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 148° C. and a single peak in DSC measurement. Further, the Mv of the pellet was 8,800. The pellets were injection molded to obtain a 2 mm thick plate-shaped molded piece, a 3 mm thick disc, and a 4 mm thick prismatic molded piece. The molded body was transparent. Table 1 shows the evaluation results.

Example 7

74.0 parts by mass of the thermoplastic resin (A1) produced in Synthesis Example 1 and 26.0 parts by mass of the thermoplastic resin (B2) produced in Synthesis Example 3 were well mixed, and then the thermoplastic resin (A1) and thermoplastic resin (B2) were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellet had a Tg of 152° C. and a single peak in DSC measurement. Further, the Mv of the pellet was 8,600. The pellets were injection molded to obtain a 2 mm thick plate-shaped molded piece, a 3 mm thick disc, and a 4 mm thick prismatic molded piece. The molded body was transparent. Table 1 shows the evaluation results.

Comparative Example 1

The pellets prepared in Synthesis Example 1 were injection molded to obtain a 2 mm thick plate-shaped molded piece, a 3 mm thick disc, and a 4 mm thick prismatic molded piece. The molded body was transparent. Table 1 shows the evaluation results.

Comparative Example 2

The pellets prepared in Synthesis Example 2 were injection molded to obtain a 2 mm thick plate-shaped molded piece, a 3 mm thick disc and a 4 mm thick prismatic molded piece. The molded body was transparent. Table 1 shows the evaluation results.

Comparative Example 3

The pellets prepared in Synthesis Example 3 were injection molded to obtain a 2 mm-thick plate-shaped molded piece, a 3-mm-thick disc, and a 4-mm-thick prismatic molded piece. The molded body was transparent. Table 1 shows the evaluation results.

Comparative Example 4

Pellets of polycarbonate resin "AD-5503" (manufactured by Teijin Ltd.) made of a bisphenol A polycarbonate resin were injection molded to obtain a 2 mm thick plate-shaped molded piece, a 3 mm thick disc and a 4 mm thick prismatic molded piece. The molded body was transparent. Table 1 shows the evaluation results.

Comparative Example 5

50.0 parts by mass of the thermoplastic resin (A1) pellets produced in Synthesis Example 1 and 50.0 parts by mass of AD-5503 pellets were well mixed, and then the thermoplastic resin (A1) and AD-5503 were melt-kneaded and pelletized by the extruding machine (manufactured by Japan Steel Works, Ltd. TEX30α 30 mm diameter twin-screw extruder) at 270° C. and a vent pressure of 30 mmHg to obtain blended pellets. The pellets became cloudy. Table 1 shows the evaluation results.

TABLE 1

| | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|---|
| Mass ratio | Resin (A1) | 23.0 | 44.0 | 64.0 | 86.0 | 95.0 | 44.0 | 74.0 | 100.0 | — | — | — | 50.0 |
| | Resin (B1) | 77.0 | 56.0 | 36.0 | 14.0 | 5.0 | — | — | — | 100.0 | — | — | — |
| | Resin (B2) | — | — | — | — | — | 56.0 | 26.0 | — | — | 100.0 | — | — |
| | AD-5503 | — | — | — | — | — | — | — | — | — | — | 100.0 | 50.0 |
| Refractive index | Nd/20° C. | 1.650 | 1.660 | 1.670 | 1.680 | 1.684 | 1.660 | 1.674 | 1.687 | 1.639 | 1.640 | 1.584 | cloudy |
| Abbe number | Vd/20° C. | 21.8 | 20.8 | 19.8 | 18.9 | 18.5 | 20.8 | 19.4 | 18.3 | 23.3 | 23.9 | 30.0 | |
| Unnotched Charpy impact strength | J/m$^2$ | 103 | 66 | 41 | 30 | 27 | 58 | 34 | 23 | N.B. | N.B. | N.B. | |
| Water absorption rate | % by mass | 0.14 | 0.14 | 0.14 | 0.13 | 0.12 | 0.13 | 0.12 | 0.12 | 0.16 | 0.10 | 0.23 | |
| Hz | % | 0.3 | 0.4 | 0.4 | 0.3 | 0.3 | 0.2 | 0.2 | 0.3 | 0.2 | 0.2 | 0.2 | |
| Tg | ° C. | 151 | 152 | 153 | 154 | 155 | 148 | 152 | 155 | 149 | 142 | 145 | |
| Mv | — | 9,700 | 9,400 | 9,000 | 8,600 | 8,500 | 8,800 | 8,600 | 8,400 | 10,100 | 9,400 | 15,200 | |
| Orientation birefringence $\|\Delta n\|$ ($\times 10^{-3}$) | — | 1.2 | 2.1 | 3.0 | 4.1 | 4.5 | 1.6 | 3.3 | 4.7 | 0.1 | 0.8 | 20.0 | |

INDUSTRIAL APPLICABILITY

The thermoplastic resin of the present invention is used for optical materials, can be used for optical members such as optical lenses, prisms, optical discs, transparent conductive substrates, optical cards, sheets, films, optical fibers, optical films, optical filters, and hard coat films, and is very useful especially for the optical lenses.

The invention claimed is:

1. A thermoplastic resin composition comprising a thermoplastic resin (A) containing a unit represented by formula (1) and a thermoplastic resin (B) containing a unit represented by formula (2), (1)

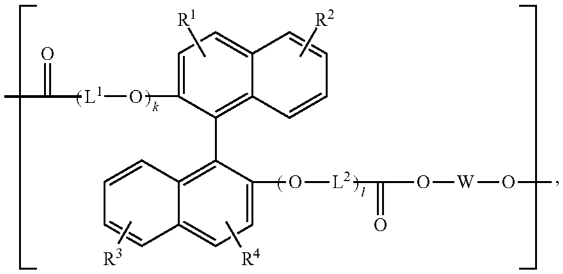

wherein in the formula (1), $L^1$ and $L^2$ each independently represent a divalent linking group, k and l each independently represent an integer of 0 or more, $R^1$, $R^2$, $R^3$, and $R^4$ each independently represent a hydrogen atom or a hydrocarbon group having 1 to 20 carbon atoms, and W represents a divalent linking group, and (2)

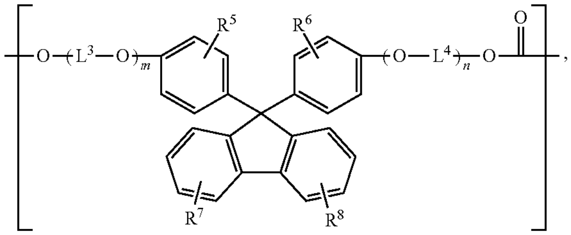

wherein in the formula (2), $L^3$ and $L^4$ each independently represent a divalent linking group, m and n each independently represent an integer of 0 or more, and $R^5$, $R^6$, $R^7$, and $R^8$ each independently represent a hydrogen atom or a hydrocarbon group having 1 to 20 carbon atoms, wherein W in the formula (1) includes formula (3) or (4), (3)

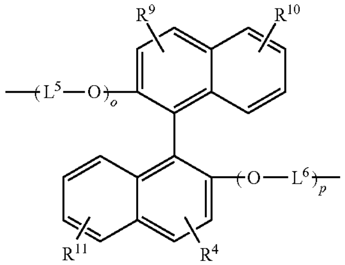

wherein in the formula (3), $L^5$ and $L^6$ each independently represent a divalent linking group, o and p each independently represent an integer of 0 or more, and $R^9$, $R^{10}$, $R^{11}$, and $R^{12}$ each independently represent a hydrogen atom or a hydrocarbon group having 1 to 20 carbon atoms, and (4)

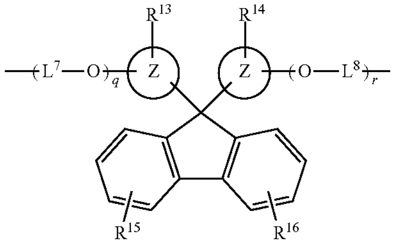

wherein in the formula (4), rings Z are a naphthalene ring, $L^7$ and $L^8$ each independently represent a divalent linking group, q and r each independently represent an integer of 0 or more, and $R^{13}$, $R^{14}$, $R^{15}$, and $R^{16}$ each independently represent a hydrogen atom or a hydrocarbon group having 1 to 20 carbon atoms, and the thermoplastic resin composition has an unnotched Charpy impact strength of 25 $J/m^2$ or more.

2. The thermoplastic resin composition according to claim 1, having a haze of 0.5% or less when measured at a thickness of 3 mm.

3. The thermoplastic resin composition according to claim 1, wherein a mass ratio (A:B) of the thermoplastic resin (A) and the thermoplastic resin (B) is 1:99 to 99:1.

4. The thermoplastic resin composition according to claim 1, having a refractive index of 1.645 to 1.690.

5. The thermoplastic resin composition according to claim 1, having an orientation birefringence of $4.5\times10^{-3}$ or less.

6. The thermoplastic resin composition according to claim 1, wherein the thermoplastic resin (A) is a polyester carbonate resin.

7. The thermoplastic resin composition according to claim 1, wherein the thermoplastic resin (B) is a polyester carbonate resin or a polycarbonate resin.

8. An optical member comprising the thermoplastic resin composition according to claim 1.

* * * * *